(12) United States Patent
Yin et al.

(10) Patent No.: US 10,948,159 B2
(45) Date of Patent: Mar. 16, 2021

(54) LENS, LIGHT SOURCE MODULE, AND LIGHTING DEVICE

(71) Applicant: OPPLE LIGHTING CO., LTD., Shanghai (CN)

(72) Inventors: Song Yin, Shanghai (CN); Shitao Deng, Shanghai (CN); Jianguo Li, Shanghai (CN); Ming Chen, Shanghai (CN); Binbin Yao, Shanghai (CN)

(73) Assignee: Opple Lighting Co., Ltd., Shanghai (CN)

( * ) Notice: Subject to any disclaimer, the term of this patent is extended or adjusted under 35 U.S.C. 154(b) by 13 days.

(21) Appl. No.: 16/521,218

(22) Filed: Jul. 24, 2019

(65) Prior Publication Data
US 2019/0346110 A1 Nov. 14, 2019

Related U.S. Application Data

(63) Continuation of application No. PCT/CN2018/073857, filed on Jan. 23, 2018.

(30) Foreign Application Priority Data

Feb. 7, 2017 (CN) .......................... 201710067113.7
Feb. 7, 2017 (CN) .......................... 201720112637.9

(51) Int. Cl.
*F21V 5/04* (2006.01)
*F21V 13/04* (2006.01)
(Continued)

(52) U.S. Cl.
CPC ................ *F21V 5/04* (2013.01); *F21V 13/04* (2013.01); *F21Y 2103/10* (2016.08); *F21Y 2103/33* (2016.08); *F21Y 2115/10* (2016.08)

(58) Field of Classification Search
CPC ........ F21V 5/04; F21V 13/04; F21Y 2115/10; F21Y 2103/10
See application file for complete search history.

(56) References Cited

U.S. PATENT DOCUMENTS 8,475,009 B2 * 7/2013 Brennan ................... B64F 1/20
362/309
8,727,581 B2 * 5/2014 Saccomanno ........ G02B 6/0095
362/336
(Continued)

FOREIGN PATENT DOCUMENTS

CN 104279506 A 1/2015
CN 105318275 A 2/2016
(Continued)

OTHER PUBLICATIONS

International Search Report (including English translation) and Written Opinion issued in PCT/CN2018/073857, dated Apr. 23, 2018, 15 pages.
(Continued)

*Primary Examiner* — Anabel Ton
(74) *Attorney, Agent, or Firm* — Arch & Lake LLP

(57) ABSTRACT

A lens is provided. The lens includes a bottom surface, an inner surface, an outer surface, and a first receiving chamber configured to receive a light-emitting component; the inner surface includes one first light-incident surface and two second light-incident surfaces, the two second light-incident surfaces are opposite to each other, the first light-incident surface is a curved surface or a planar surface, the bottom surface is a surface adjacent to the second light-incident, the outer surface includes two first reflective surfaces forming a V-shaped structure; two first light-exiting surfaces located at both sides of the two first reflective surfaces; and two second light-exiting surfaces adjacent to the first light-exiting surfaces.

19 Claims, 11 Drawing Sheets

(51) Int. Cl.
*F21Y 103/10* (2016.01)
*F21Y 103/33* (2016.01)
*F21Y 115/10* (2016.01)

(56) References Cited

U.S. PATENT DOCUMENTS

| | | | |
|---|---|---|---|
| 8,979,321 B2* | 3/2015 | Hukkanen | G02B 19/0028 362/308 |
| 2008/0285287 A1* | 11/2008 | Chang | G02B 6/0021 362/309 |
| 2009/0067170 A1* | 3/2009 | Bloemen | F21V 5/045 362/235 |
| 2014/0146554 A1* | 5/2014 | Giraud | F21S 43/14 362/511 |
| 2014/0254134 A1* | 9/2014 | Pelka | F25D 27/00 362/92 |
| 2015/0177439 A1* | 6/2015 | Durkee | F21V 23/06 362/555 |

FOREIGN PATENT DOCUMENTS

| | | |
|---|---|---|
| CN | 205332090 U | 6/2016 |
| CN | 106500012 A | 3/2017 |
| CN | 206291098 U | 6/2017 |
| CN | 206330085 U | 7/2017 |
| CN | 107044598 A | 8/2017 |
| CN | 206478514 U | 9/2017 |
| CN | 206682702 U | 11/2017 |
| KR | 101322890 B | 10/2013 |

OTHER PUBLICATIONS

Chinese Office Action issued in CN201710067113.7, dated Jul. 4, 2018, 11 pages.
Chinese Office Action issued in CN201710067113.7, dated Mar. 12, 2019, 7 pages.

* cited by examiner

LENS, LIGHT SOURCE MODULE, AND LIGHTING DEVICE

CROSS-REFERENCE TO RELATED APPLICATIONS

This application is based upon and claims the priority of PCT patent application No. PCT/CN2018/073857 filed on Jan. 23, 2018 which claims the priority of Chinese Patent Application No. 201710067113.7 filed on Feb. 7, 2017, and Chinese Patent Application No. 201720112637.9 filed on Feb. 7, 2017, the entire content of all of which is hereby incorporated by reference herein for all purposes.

TECHNICAL FIELD

The present disclosure relates to the field of lighting technology, and particularly to a lens used for a lighting device.

BACKGROUND

As for a lens that has been widely applied to the display or lighting field such as TV backlight, ceiling lamp and advertising light box, etc., it is necessary for the lens to have emergent light with the dual characteristics of large-angle and uniformity.

SUMMARY

The present disclosure discloses a lens.

According to a first aspect, a lens is provided. The lens may include a bottom surface, an inner surface, an outer surface, and a first receiving chamber; the first receiving chamber being configured to receive a light-emitting component, a wall surface of the first receiving chamber being the inner surface of the lens.

The lens may be in an axially symmetric structure, the inner surface may include one first light-incident surface and two second light-incident surfaces, the two second light-incident surfaces may be opposite to each other and may be adjacent to the first light-incident surface; the first light-incident surface may be a curved surface or a planar surface, each of the two second light-incident surfaces may be a curved surface protruding toward a direction away from the first receiving chamber; and the first receiving chamber may be defined by the first light-incident surface and the second light-incident surfaces.

The bottom surface may be a surface adjacent to the second light-incident surface; and the outer surface may include two first reflective surfaces, two first light-exiting surfaces, and two second light-exiting surfaces; the two first reflective surfaces may be located in a middle top region and are intersected with each other; the two first light-exiting surfaces may be located at both sides of the two first reflective surfaces; each of the two first light-exiting surfaces may be intersected with one of the first reflective surfaces; and the two second light-exiting surfaces may be adjacent to the first light-exiting surfaces; and the two first reflective surfaces may form a V-shaped structure, and each of the second light-exiting surfaces may be a curved surface protruding toward a direction away from the first receiving chamber.

According to a second aspect, a lens is provided. The lens may include a bottom surface, an inner surface, an outer surface, and a first receiving chamber configured to receive a light-emitting component, a wall surface of the first receiving chamber being the inner surface of the lens.

The inner surface may include one first light-incident surface and a pair of second light-incident surfaces, the pair of second light-incident surfaces may be opposite to each other, the first light-incident surface may be connected with upper edges of the pair of second light-incident surfaces substantially in a horizontal direction.

The outer surface may include two first reflective surfaces, two first light-exiting surfaces, and two second light-exiting surfaces; the two first reflective surfaces may be located in a middle top region and are intersected with each other, the two first light-exiting surfaces may be located at both sides of the two first reflective surfaces; and each of the two first light-exiting surfaces may be intersected with one of the two first reflective surfaces; and the two second light-exiting surfaces may be adjacent to the first light-exiting surfaces; and the two first reflective surfaces may form a V-shaped structure, and the pair of the second light-incident surfaces and the two second light-exiting surfaces may form a dual curved surface structure.

It is to be understood that both the foregoing general description and the following detailed description are exemplary and explanatory only and are not restrictive of the present disclosure.

BRIEF DESCRIPTION OF THE DRAWINGS

The drawings described herein are used to provide a further understanding of the present disclosure and constitute a part of the present disclosure. The examples of the present disclosure and the descriptions thereof are used to explain the present disclosure but not to constitute improper limitations to the present disclosure. In the drawings.

DETAILED DESCRIPTION

In order to make objectives, technical solutions and advantages of the present disclosure more clear, the technical solutions of the present disclosure will be described in a clearly and fully understandable way in connection with the drawings related to the examples of the present disclosure. Apparently, the described examples are just a part but not all of the examples of the present disclosure. Based on the described examples herein, those skilled in the art can obtain other example(s), without any inventive work, which should be within the protection scope of the present disclosure.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Sometimes, a lens is limited by its own shape and material properties, the angle of emergent light may be small and the uniformity may be poor upon light emitted from a light source undergoing a secondary light distribution of the lens. As a result, effects of emergent light in a wide angle range and high uniformity cannot be effectively formed.

Figure 1:
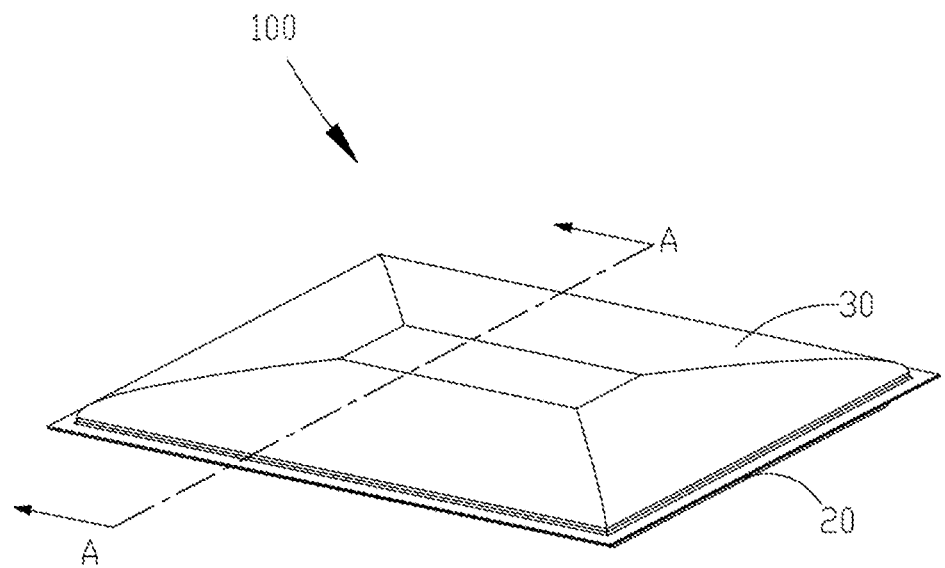
FIG. 1 is a perspective view illustrating a lighting device provided by a first example of the present disclosure.
Figure 2:
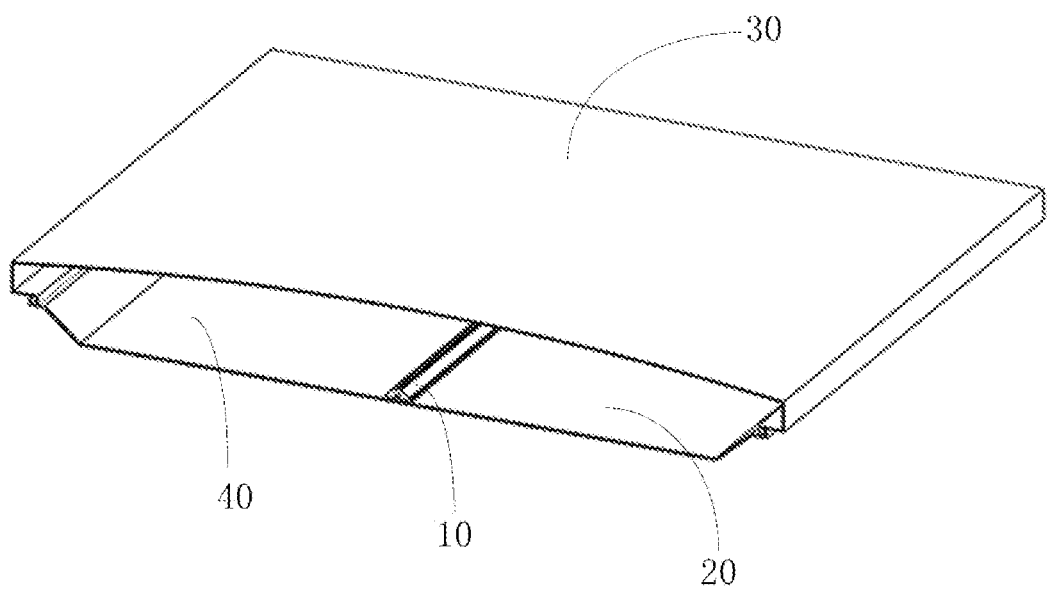
FIG. 2 is a cross-sectional view of FIG. 1 taken along line A-A.
Figure 3:
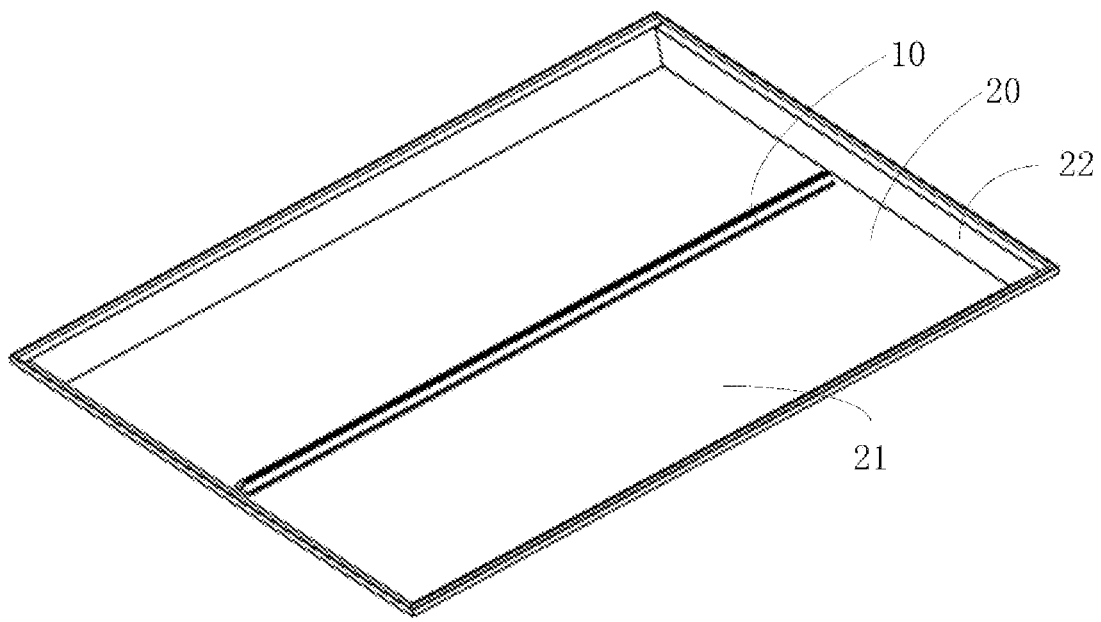
FIG. 3 is a perspective view illustrating a chassis and a light source module provided by the first example of the present disclosure after being assembled.

As a first example, FIG. 1 to FIG. 3 illustrate a lighting device 100 provided by the present disclosure, which includes a chassis 20, a cover 30 connected with the chassis 20, and a light source module 10 fixed on the chassis 20. A second receiving chamber 40 is formed by connecting the cover 30 with the chassis 20, and the light source module 10 is received within the second receiving chamber 40. The light source module 10 provided by the example of the present disclosure can be applied separately within a lighting fixture such as a ceiling lamp, an advertising light box or the like.

Hereinafter, various components and connecting relationships among components in the lighting device 100 provided by the first example of the present disclosure will be described in more details.

As illustrated in FIG. 1 to FIG. 3, the chassis 20 is substantially in a cuboid shape, and has a plate-shaped bottom plate 21 and a sidewall 22 formed by extending vertically from a periphery of the bottom plate 21. The chassis 20 has a width greater than 550 mm and may be made of metallic material, plastic, thermally conductive plastic or the like. The chassis 20 may be installed on a mounting base such as a ceiling or the like.

The cover 30 covers the chassis 20 and is located at a side of the chassis 20, and the cover 30 has an outer surface in an arc shape. In other alternative examples, the outer surface of the cover 30 may also be a planar surface. The cover 30 is made of a transparent material, such as acrylic, etc., which has a brightness balance effect. A way of plugging-in, clamping, screw connection or the like may be adopted for a connection between the cover 30 and the chassis 20. In other alternative examples, it is also possible that the cover 30 is not provided within the lighting device 100.

Figure 4:
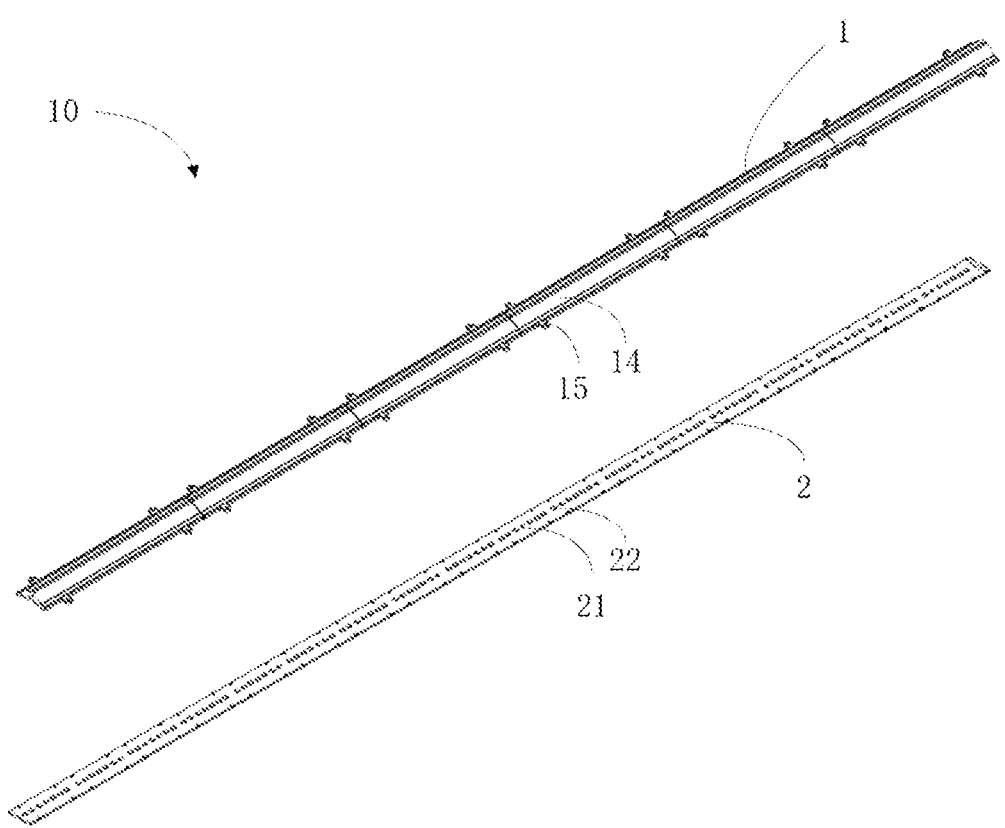
FIG. 4 is an exploded view illustrating a light source module provided by the first example of the present disclosure.
Figure 5:
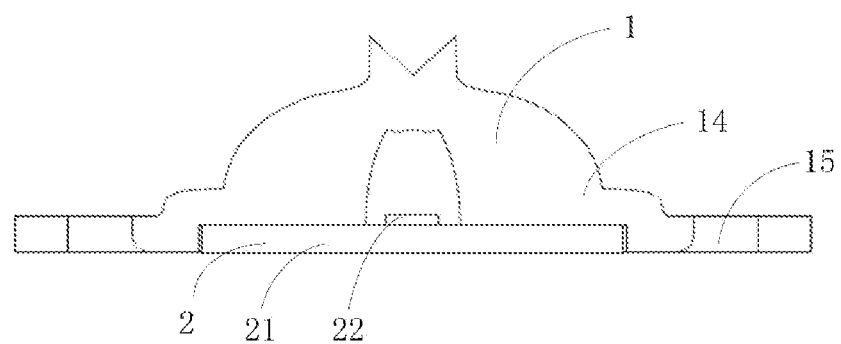
FIG. 5 is a schematically cross-sectional view illustrating the light source module based on FIG. 4 after being assembled.

As illustrated in FIG. 4 to FIG. 5, in this example, the light source module 10 includes a lens 1 and a light-emitting component 2 received within the lens 1. The light source modules 10 is provided as a group that has two ends located in middle positions of horizontal sidewalls of the chassis 20, respectively; and extends in a longitudinal direction of a longitudinal sidewall of the chassis 20. A length of the light source module 10 is equal to a length of the chassis 20 in a longitudinal direction. In other alternative examples, a length of the light source module 10 may also be other lengths such as a half, two thirds or the like of the chassis 20.

The lens 1 is in a linear form, and is formed by an integral stretch. The lens 1 has a main portion 14 formed by stretching along a longitudinal direction, and a width of the main portion 14 is less than 32 mm. A plurality of first connecting portions 15 are provided at both sides of the lowest end of the main portion 14 of the lens 1, and are arranged along the longitudinal direction of the main portion 14, each first connecting portion 15 protrudes outward with respect to the main portion 14. The first connecting portion 15 is provided with a through hole (not denoted) for running through of a screw. In the present example, a plurality of straight strip lenses 1 are installed, the plurality of lenses 1 are connected with each other to form a line by abutting an end of one lens against an end of the other lens adjacent thereto. Upon installation, a method includes positioning the light-emitting component 2 on the bottom plate 21 firstly, sequentially installing the lenses 1 over the light-emitting component 2, and then fixing the lenses 1 on the chassis 20 with screws (not illustrated) running through the through holes (not denoted) of the first connecting portions 15. In other example, it is possible that only one lens in a straight strip shape is installed.

Figure 6:
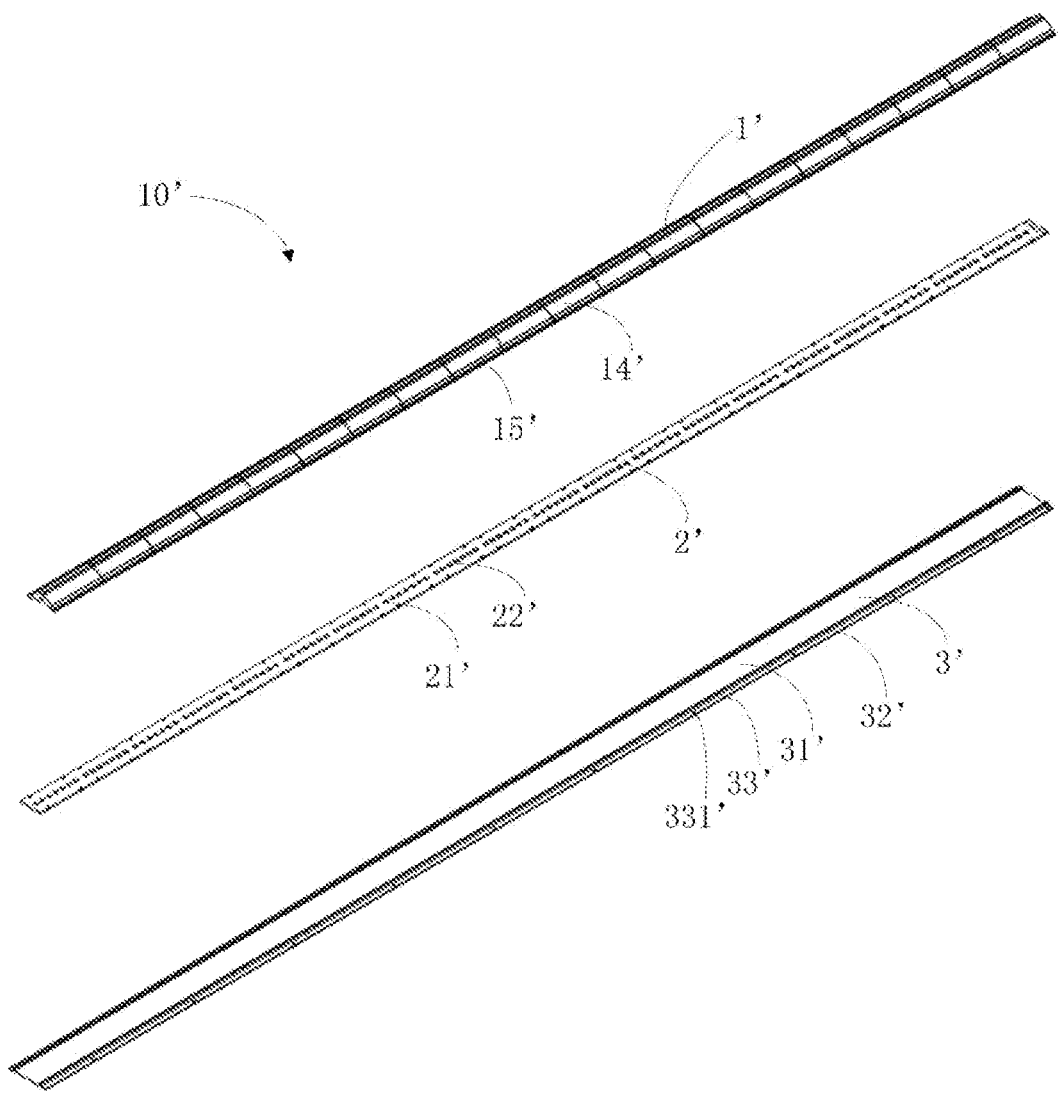
FIG. 6 is an exploded view illustrating another light source module provided by the first example of the present disclosure.
Figure 7:
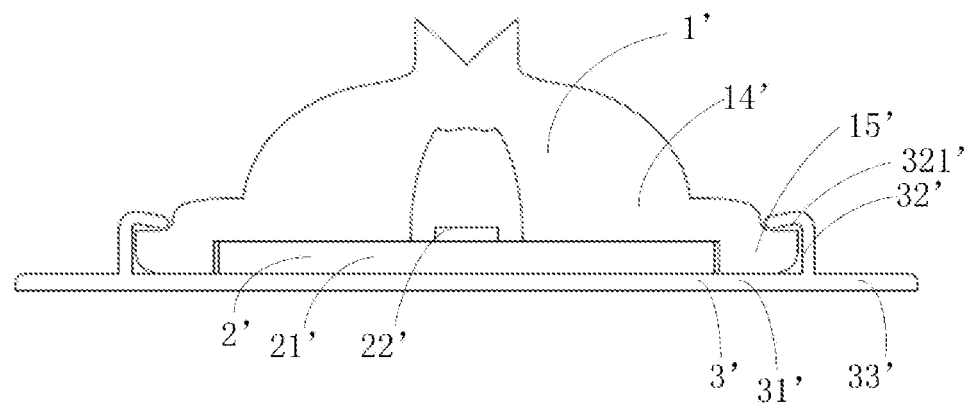
FIG. 7 is a schematically cross-sectional view illustrating the light source module based on FIG. 6 after being assembled.

In other alternative examples, another light source module 10' may be employed instead. As illustrated in FIG. 6 and FIG. 7, the light source module 10' includes a mounting pedestal 3', a lens 1' mounted over the mounting pedestal 3', and a light-emitting component 2' received within the lens 1'.

The mounting pedestal 3' is in a long strip shape, and has a bottom surface attached to the chassis 20. In the present example, the mounting pedestal 3' is of aluminum profile, or made of other material with good heat dissipation. The mounting pedestal 3' has a plate-shaped base portion 31' in a rectangular shape; a pair of mounting portions 32' configured to install the lens 1'; and a second connecting portion 33' located on an outer side of the mounting portion 32'. The pair of mounting portions 32' are located at both long sides of the base portion 31', respectively; each mounting portion 32' is formed by extending from the long side of the base portion 31 'and then bending toward the lens 1'. The mounting portions 32' extends toward each other and are partially overlapped with the base portion 31'. The base portion 31' and the mounting portions 32' form a mounting zone 321' configured to fix the lens 1' in a clamp-fitted manner. A through hole 331' for running through of a screw (not illustrated) is provided on the second connecting portion 33'.

The lens 1' is in a linear form, and is formed by an integral stretch. The lens 1' has a main portion 14' extending along the longitudinal direction, and a width of the main portion 14 is less than 32 mm. Two second connecting portion 15' are provided at both sides of the lowest end of the main portion 14' of the lens 1' along the longitudinal direction, each second connecting portion 15' is in a long strip shape and protrudes outward with respect to the main portion 14'. In the present example, a plurality of lenses 1' are installed, each lens is in a straight strip shape, and the plurality of lenses 1' are connected with each other to form a line by abutting an end of one lens against an end of the other lens adjacent thereto. Upon installation, a method includes: sequentially installing the lenses 1 over a light-emitting component 2' in a snap-fitted manner firstly, installing the connecting portions 15' of the lenses 1' within the mounting zone 321', and then fixing the lenses 1' on the chassis 20 with a screw (not illustrated) running through the through hole 331' of the second connecting portion 33'. In other example, it is possible that only one lens 1' in a straight strip shape is installed.

The main portion 14 of the lens 1 and the main portion 14' of the lens 1' are both axially symmetrical structures, and have extending directions in longitudinal directions, respectively. Cross sections of the main portion 14 of the lens 1 in the longitudinal direction are the same, and cross sections of the main portion 14' of the lens 1' in the longitudinal direction are the same. Specific descriptions will be described with reference to the main portion 14 of the lens 1 in the lens 1 provided by the present example, by way of example.

Figure 8:
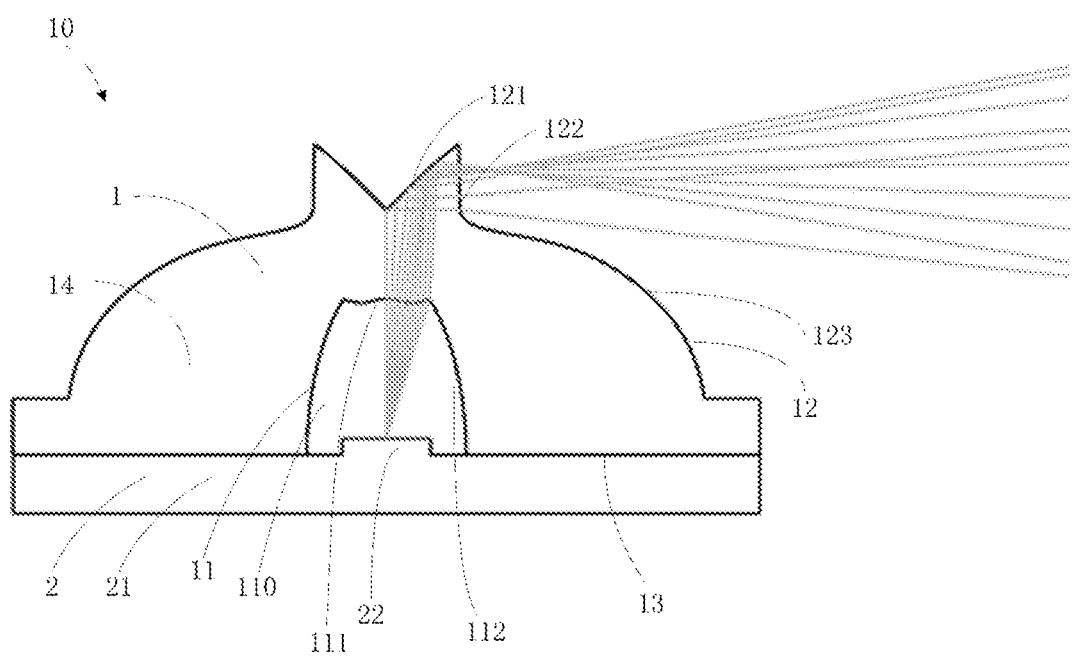
FIG. 8 is a schematically cross-sectional view illustrating a combination of a lens and a light-emitting component within a light source module provided by the first example of the present disclosure.

As illustrated in FIG. 8, the main portion 14 of the lens 1 has an inner surface 11, an outer surface 12, a bottom surface 13, and a first receiving chamber 110, a wall surface of the first receiving chamber 110 is the inner surface 11 of the lens 1. A height of the first receiving chamber 110 is greater than a half of a height of the lens 1.

A cross section of the inner surface 11 includes a first light-incident surface 111 and two second light-incident surfaces 112; and the two second light-incident surfaces 112 are opposite to each other, and are surfaces adjacent to the first light-incident surface 111, respectively. In this example, the first light-incident surface 111 is a wavy curved surface, and the second light-incident surface 112 is a curved surface protruding toward a direction away from the first receiving chamber 110.

The outer surface 12 includes two first reflective surfaces 121, two first light-exiting surfaces 122, and two second light-exiting surfaces 123. The two first reflective surfaces 121 are located in a middle top region and are intersected with each other, the two first light-exiting surfaces 122 are located at both sides of the two first reflective surfaces 121, respectively; each of the two first light-exiting surfaces 122 is intersected with the first reflective surface 121 adjacent thereto; and the two second light-exiting surfaces 123 are adjacent to the first light-exiting surfaces 122, respectively; and the two first reflective surfaces 121 are in a V-shaped structure. The first reflective surface 121 may be a curved surface or a planar surface. The first light-exiting surface 122 is a planar surface, and may be substantially perpendicular to the bottom surface 13, or may have other included angles with respect to the bottom surface 13. The second light-exiting surface 123 is a curved surface protruding toward a direction away from the first receiving chamber 110. A height of a ridged line at which the two first reflective surfaces 121 are intersected with each other with respect to the bottom surface 13 is smaller than a height of a ridged line at which the first light-exiting surface 122 and the first reflective surface 121 are intersected with each other with respect to the bottom surface 13.

Regarding the lens 1 provided by this example, a width of the first light-incident surface 111 is smaller than a distance between two edge lines of the two first light-exiting surfaces 111 that are opposite to each other. The second light-incident surface 112 has a first end and a second end along a height direction, the first light-exiting surface 122 also has a first end and a second end along the height direction, the second end of the second light-incident surface 112 is closer to the bottom surface than the first end of the second light-incident surface 112, the second end of the first light-exiting surface 122 is closer to the bottom surface than the first end of the first light-exiting surface 122, and a distance between the two first ends is less than a distance between the two second ends. That is, a thickness of a part of the main portion of the lens 1 where the first light-incident surface 111 is opposite to the second light-exiting surface 123 is gradually increased from top to bottom.

The light-emitting component 2 includes a one-piece light source plate 21 in a long strip shape and a plurality of light-emitting units 22 arranged on the light source plate 21 in a longitudinal direction. In this example, the light source plate 21 is of a one-piece type, and the light-emitting unit 22 is a LED light source. In other example, the light source plate 21 may also be segmented, and the light-emitting unit 22 may also be a TL light source or other light sources. A driving power supply component (not illustrated) may be arranged separately with or integrally with the light-emitting component 2. The light source plate 21 is attached to the bottom surface 13 of the lens 1, and the light-emitting units 22 are received within the first receiving chamber 110.

Figure 9:
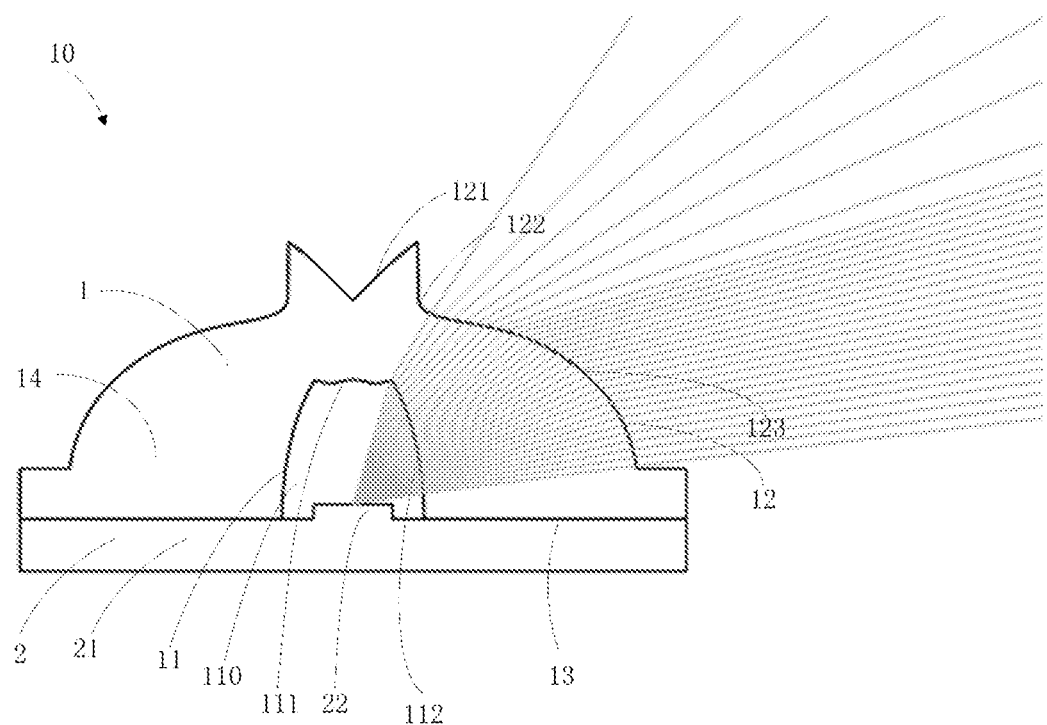
FIG. 9 is a diagram illustrating another part of an optical path of the light source module based on FIG. 8.

As illustrated in FIG. 8 and FIG. 9, an optical path system of the lens 1 includes two parts, and the first part of the optical path system includes a collimation plus total reflection optical path. Specifically, light rays incident onto the first light-incident surface 111 are collimated upon being refracted by the first light-incident surface 111, then are incident onto the first reflective surface 121 to be totally reflected by the first reflective surface 121, and exit through the first light-exiting surface 122. In this way, the energy of the light-emitting unit 22 in the direction of central light intensity and its vicinity is deflected to a large-angle direction. The second part of optical path system is a dual curved surface structure, that is, a structure composed of two curved surfaces: the second light-incident surface 112 and the second light-exiting surface 123. Specifically, light rays incident onto the second light-incident surface 112 are incident onto the second light-exiting surface 123 upon being refracted, and exit through the second light-exiting surface 123 upon being refracted, so that the energy of the light-emitting unit 22 far from the direction of central light intensity is evenly distributed over a whole target space. As for light rays emitted from the light-emitting unit 22, with aid of a superimposition of the energy of the first part and the second part of the optical path system, a wide-angle light intensity distribution is achieved.

Regarding the lighting device 100 provided by the example of the disclosure adopts a collimation plus total reflection structure and a dual curved surface structure to make emergent light rays be superimposed, so that light rays that exit through the lighting device has a wide coverage angle, and by use of this design of an optical path including two parts, the energy at different positions arrives the target positions, respectively; and an effect of increasing the uniformity of emergent light is achieved by a combination of the two parts of the optical path. A lens 1 with a width of less than 32 mm can make a lighting device 100 with a width of greater than 550 mm emit light evenly. That is to say, in the condition that a ratio of a width of the lens 1 to a width of the chassis 20 is less than 0.06, the angle of the emergent light of each lens 1 is sufficient to make the whole lighting device 100 emit light evenly. With an aid of the less number of lenses, the uniform irradiation area of a lighting fixture with larger volume is realized, thereby reducing the cost.

Figure 10:
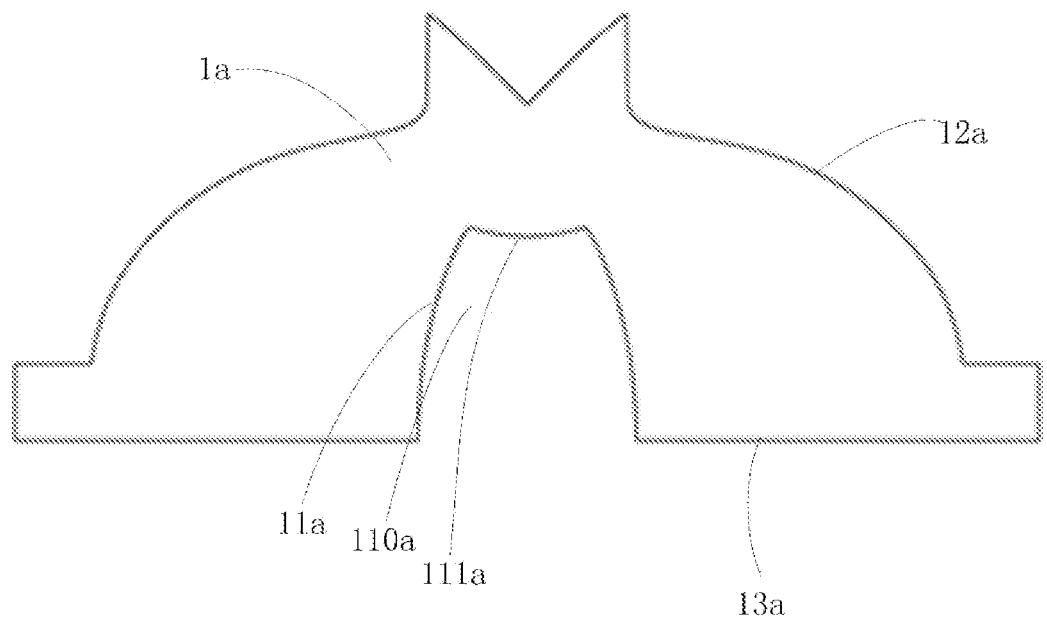
FIG. 10 is a cross-sectional view illustrating a lens provided by a second example of the present disclosure.

Referring to that illustrated in FIG. 10, a lens 1*a* is provided by a second example of the present disclosure, and the lens 1*a* is applied within the lighting device 100 provided by the first example of the present disclosure. The lens 1*a* is also in a linear form, and a structure of a cross section of the lens 1*a* is similar to that of the lens 1 provided by the first example. The lens 1*a* has an inner surface 11*a*, an outer surface 12*a*, a bottom surface 13*a*, and a first receiving chamber 110*a* configured to receive a light-emitting unit (not illustrated), and a wall surface of the first receiving chamber 110*a* is the inner surface 11*a* of the lens 1*a*.

The lens 1*a* differs from the lens 1 provided by the first example only in that, the first light-incident surface 111*a* of the lens 1*a* is a curved surface protruding toward the first receiving chamber 110*a*.

Figure 11:
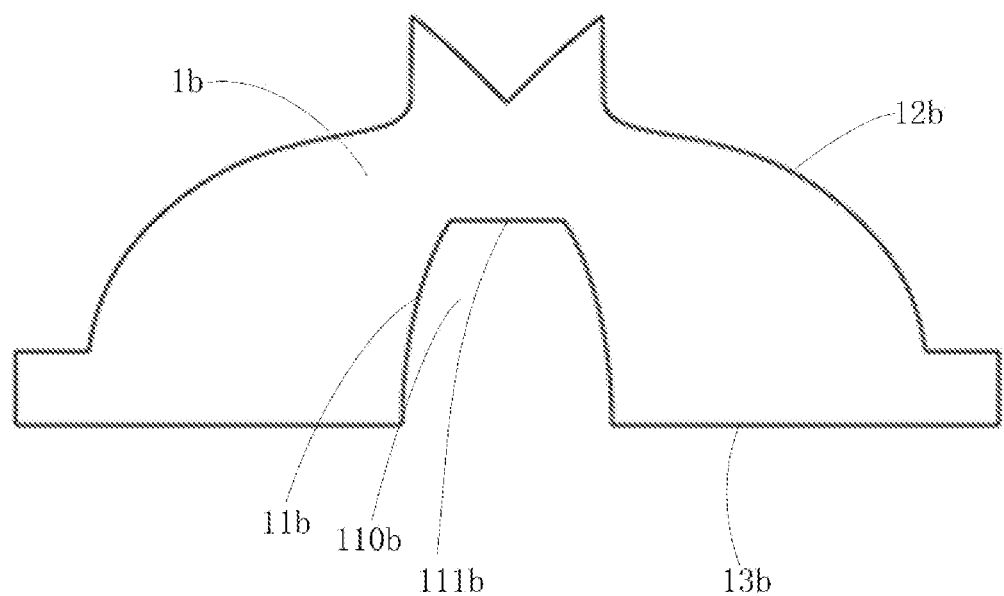
FIG. 11 is a cross-sectional view illustrating a lens provided by a third example of the present disclosure.

Referring to that illustrated in FIG. 11, a lens 1*b* is provided by a third example of the present disclosure, and the lens 1*b* is applied within the lighting device 100 provided by the first example of the present disclosure. The lens 1*b* is also in a linear form, and a structure of a cross section of the lens 1*b* is similar to that of the lens 1 provided by the first example. The lens 1*b* has an inner surface 11*b*, an outer surface 12*b*, a bottom surface 13*b*, and a first receiving chamber 110*b* configured to receive a light-emitting unit (not illustrated), and a wall surface of the first receiving chamber 110*b* is the inner surface 11*b* of the lens 1*b*.

The lens 1*b* differs from the lens 1 provided by the first example only in that, the first light-incident surface 111*b* of the lens 1*b* is a planar surface.

Figure 12:
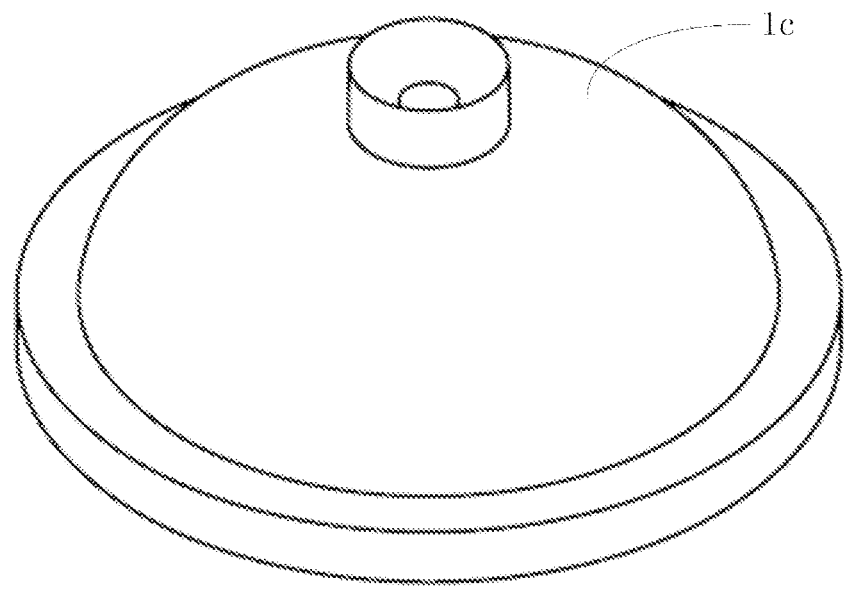
FIG. 12 is a perspective view illustrating a lens provided by a fourth example of the present disclosure.
Figure 13:
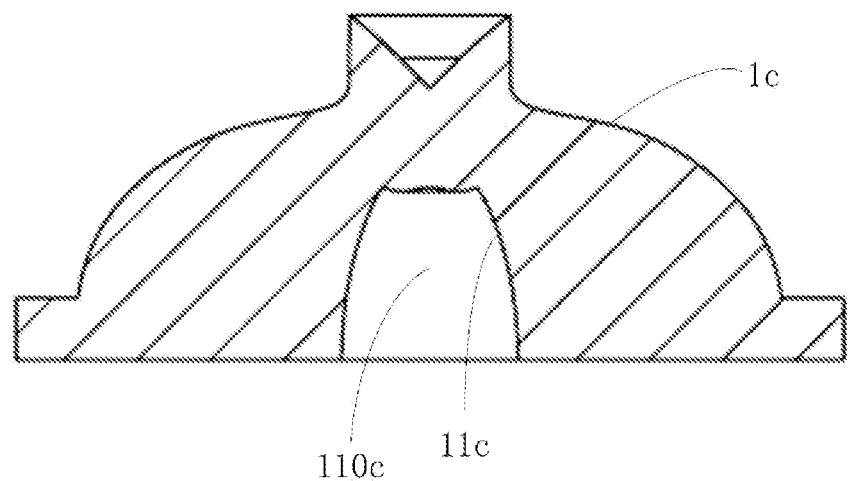
FIG. 13 is a sectional view of FIG. 12.

Referring to those illustrated in FIG. 12 and FIG. 13, a lens 1*c* is provided by a fourth example of the present disclosure, and the lens 1*c* can be applied within the lighting device 100 provided by the first example of the present disclosure. The lens 1*c* is in a circular cover shape, and is in an axis-rotationally symmetric structure with respect to a central axis. The lens 1*c* has a first receiving chamber 110*c* configured to receive a light-emitting component (not illustrated), and a wall surface of the first receiving chamber 110*c* is an inner surface 11*c* of the lens 1*c*.

The inner surface 11*c* of the lens 1*c* may be in any shape as that in the first example to the third example described above.

Figure 14:
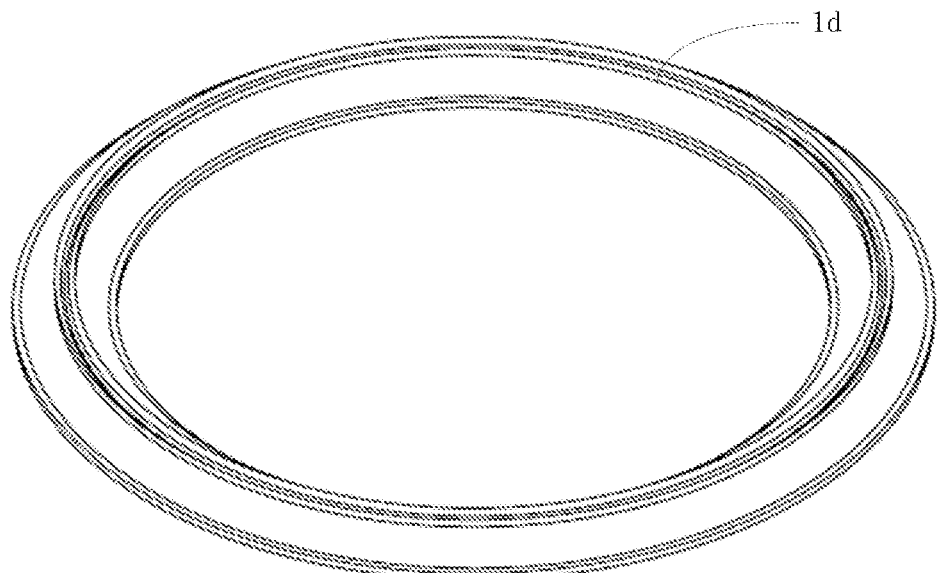
FIG. 14 is a perspective view illustrating a lens provided by a fifth example of the present disclosure.
Figure 15:
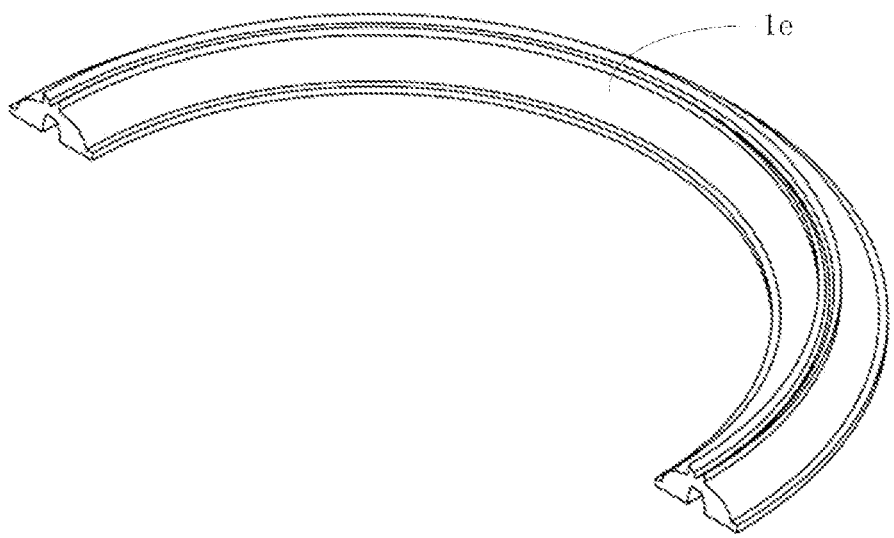
FIG. 15 is a perspective view illustrating another lens provided by the fifth example of the present disclosure.

Referring to that illustrated in FIG. 14, a fifth example of the present disclosure provides a lens 1*d*, which is in a circular ring shape and can be applied within the lighting device 100 provided by the first example of the present disclosure, and referring to that illustrated in FIG. 15, the fifth example of the present disclosure further provides a lens 1*e*, which is in a semicircular ring shape and can be applied within the lighting device 100 provided by the first example of the present disclosure. Each of the lens 1*c* and the lens 1*e* has a first receiving chamber (not denoted) configured to receive a light-emitting component (not illustrated), a wall surface of the first receiving chamber of the lens 1*d* is an inner surface (not denoted) of the lens 1*d*, and a wall surface of the first receiving chamber of the lens 1*e* is an inner surface (not denoted) of the lens 1*e*.

The inner surface of the lens 1*d* and the inner surface of the lens 1*e* may be in any shape as that in the first example to the third example described above.

Figure 16:
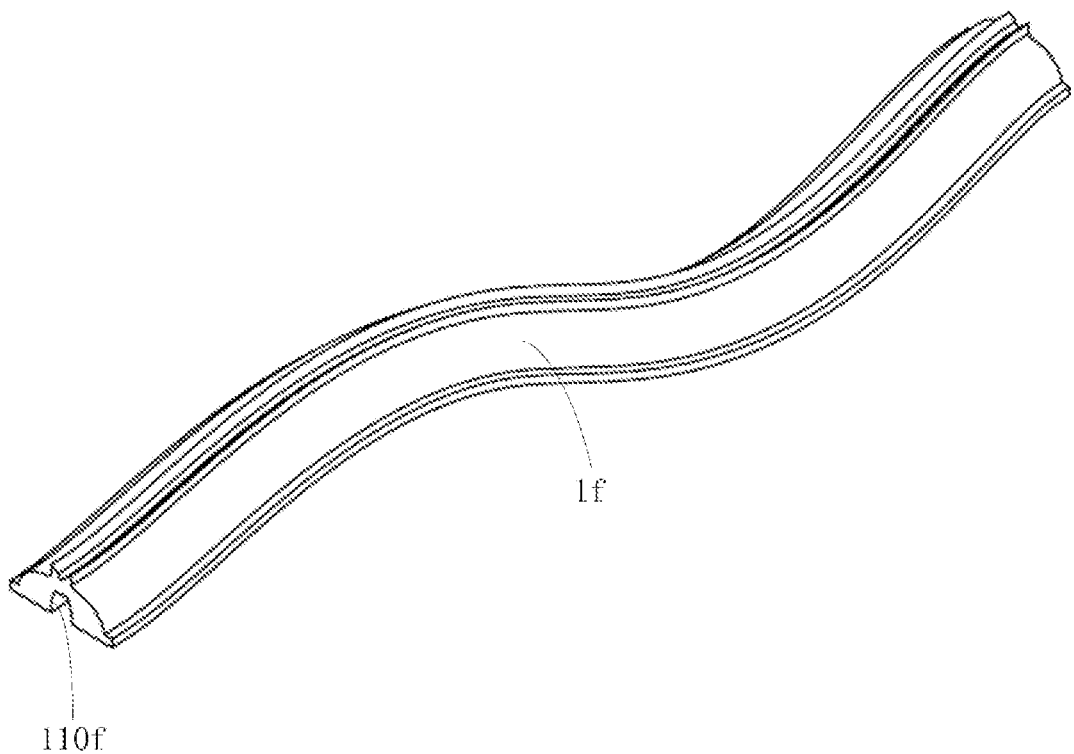
FIG. 16 is a perspective view illustrating a lens provided by a sixth example of the present disclosure.

Referring to that illustrated in FIG. 16, a sixth example of the present disclosure provides a lens 1*f*, which is in a curved shape and can be applied within the lighting device 100 provided by the first example of the present disclosure. The lens 1*f* has a first receiving chamber (not denoted) configured to receive a light-emitting component (not illustrated), a wall surface of the lens 1*f* is an inner surface 110*f* of the lens 1*f*.

The inner surface of the lens 1*f* may be in any shape as that in the first example to the third example described above.

For lenses in the above six examples, a collimation plus total reflection structure and a dual curved surface structure are used to make emergent light rays be distributed, so that light rays that exit through the lighting device have a wide coverage angle, and by use of this design of the optical path including two parts, the energy at different positions arrives the target positions, respectively; and an effect of increasing the uniformity of emergent light is achieved by a combination of the two parts of the optical path.

The present disclosure provides a lens so as to realize uniform emergent light of wide angle range.

The present disclosure provides a lens, which includes: a bottom surface, an inner surface, an outer surface, and a first receiving chamber; the first receiving chamber is configured to receive a light-emitting component, a wall surface of the first receiving chamber is the inner surface of the lens;

the lens is in an axially symmetric structure, the inner surface includes one first light-incident surface and two second light-incident surfaces, the two second light-incident surfaces are opposite to each other, and are surfaces adjacent to the first light-incident surface, respectively; the first light-incident surface is a curved surface or a planar surface, each of the two second light-incident surfaces is a curved surface protruding toward a direction away from the first receiving chamber; and the first receiving chamber is defined by the first light-incident surface and the second light-incident surfaces, the bottom surface is a surface adjacent to the second light-incident surface; and the outer surface includes two first reflective surfaces, two first light-exiting surfaces, and two second light-exiting surfaces; the two first reflective surfaces are located in a middle top region and are intersected with each other; the two first light-exiting surfaces are located at both sides of the two first reflective surfaces, respectively; each of the two first light-exiting surfaces is intersected with one of the first reflective surfaces adjacent thereto; and the two second light-exiting surfaces are adjacent to the first light-exiting surfaces, respectively; the two first reflective surfaces form a V-shaped structure, and each of the second light-exiting surfaces is a curved surface protruding toward a direction away from the first receiving chamber.

Further, light rays incident onto the first light-incident surface are collimated upon being refracted by the first light-incident surface, then are incident onto the first reflective surface to be totally reflected by the first reflective surface, and exit through the first light-exiting surface; and light rays incident onto the second light-incident surface are incident onto the second light-exiting surface upon being refracted, and exit through the second light-exiting surface upon being refracted.

Further, a height of a ridged line at which the two first reflective surfaces are intersected with each other with respect to the bottom surface is smaller than a height of a ridged line at which the first light-exiting surface and the first reflective surface are intersected with each other with respect to the bottom surface.

Further, the first light-incident surface is a wavy curved surface, or a curved surface protruding toward the first receiving chamber.

Further, the second light-exiting surface is a planar surface.

Further, the lens has a main portion formed by stretching along a longitudinal direction.

Further, connecting portions are provided at both sides of the main portion, respectively; and the connecting portions protrude outward with respect to the main portion, respectively.

Further, the lens is in the axially symmetric structure of a linear form or a curved form, an extending direction of the lens is a longitudinal direction, a direction perpendicular to the longitudinal direction is a horizontal direction, a central axis of the lens is orthogonal with both the horizontal direction and the longitudinal direction, and cross sections of the lens at every point in the longitudinal direction are the same.

Further, the lens is in an axis-rotationally symmetric structure.

Further, a width of the lens is smaller than 35 mm.

Further, a width of the first light-incident surface is smaller than a distance between two edge lines of the first light-exiting surfaces that are opposite to each other.

Further, a height of the first receiving chamber is greater than a half of a height of the lens.

Further, the second light-incident surface has a first end and a second end along a height direction, the second light-exiting surface has a first end and a second end along the height direction, the second end is closer to the bottom surface than the first end, and a distance between the two first ends is smaller than a distance between the two second ends.

Further, the lens is in a ring shape, an arc shape or an axis-rotationally symmetric shape.

The present disclosure further provides a lens, which includes: a bottom surface, an inner surface, an outer surface, and a first receiving chamber; the first receiving chamber is configured to receive a light-emitting component, a wall surface of the first receiving chamber is the inner surface of the lens;

the inner surface includes one first light-incident surface and a pair of second light-incident surfaces, the pair of second light-incident surfaces are opposite to each other, the first light-incident surface is connected with upper edges of the pair of second light-incident surfaces substantially in a horizontal direction, respectively;

the outer surface includes two first reflective surfaces, two first light-exiting surfaces, and two second light-exiting surfaces; the two first reflective surfaces are located in a middle top region and are intersected with each other, the two first light-exiting surfaces are located at both sides of the two first reflective surfaces, respectively; and each of the two first light-exiting surfaces is intersected with one of the two first reflective surfaces adjacent thereto; and the two second light-exiting surfaces are adjacent to the first light-exiting surfaces, respectively; and the two first reflective surfaces form a V-shaped structure, and the pair of the second light-incident surfaces and the two second light-exiting surfaces form a dual curved surface structure, respectively.

Further, light rays incident onto the first light-incident surface are collimated upon being refracted by the first light-incident surface, then are incident onto the first reflective surface to be totally reflected by the first reflective surface, and exit through the first light-exiting surface; and light rays incident onto the second light-incident surface are incident onto the second light-exiting surface upon being refracted, and exit through the second light-exiting surface upon being refracted.

The present disclosure further provides a light source module including a light-emitting component and the lens described above; the light-emitting component includes a light source plate and light-emitting units arranged on the light source plate, and the light-emitting units are received within the first receiving chamber of the lens.

Further, the light source plate is located beneath the bottom surface and is attached to the bottom surface.

Further, the light source plate is in a long strip shape; and the light-emitting units are arranged along a longitudinal direction of the light source plate.

Further, the lens has a main portion formed by stretching along a longitudinal direction.

Further, connecting portions are provided at both sides of the main portion, respectively; and the connecting portions protrude outward with respect to the main portion, respectively.

Further, the light source module further includes a mounting pedestal located beneath the lens, and the lens is slidable so as to be assembled to the mounting pedestal in a removable way.

Further, the mounting pedestal has a mounting portion, and the connecting portions are slidable so as to be received within the mounting portion in the removable way.

The present disclosure further provides a lighting device, which includes: a chassis, a cover connected with the chassis, and a light source module fixed on the chassis, the light source module includes a light-emitting component and the lens described above, the light-emitting component includes a light source plate and light-emitting units arranged on the light source plate, and the light-emitting units are received within the first receiving chamber of the lens.

Further, the chassis is rectangular, the lens is in a straight strip shape, two ends of the lens are located in middle positions of horizontal sidewalls of the chassis, respectively; and the lens extends in a direction of a longitudinal sidewall of the chassis.

Further, a width of the chassis is greater than 550 mm.

Further, a ratio of a width of the lens to a width of the chassis is less than 0.06.

Beneficial effects: for the lens provided by the present disclosure, emergent light rays are superimposed by using a collimation plus total reflection structure and a dual curved surface structure, so as to realize a distribution of emergent light rays at a wider angle and meet a requirement of high uniformity. Moreover, a uniform irradiation area of a lighting fixture with a larger volume can be realized with aid of less number of lenses, thereby reducing the cost.

The present disclosure may include dedicated hardware implementations such as application specific integrated circuits, programmable logic arrays and other hardware devices. The hardware implementations can be constructed to implement one or more of the methods described herein.

Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

The specific examples described above further describe the objectives, technical solutions and beneficial effects of the present disclosure in detail. It should be understood that the above are merely examples of the present disclosure and are not intended to limit the present disclosure. Any modification, equivalent replacement, improvement, etc. made within the spirit and principle of the present disclosure should be included in the protection scope of the present disclosure.

What is claimed is:

1. A lens, comprising a bottom surface, an inner surface, an outer surface, and a first receiving chamber; the first receiving chamber being configured to receive a light-emitting component, a wall surface of the first receiving chamber being the inner surface of the lens, wherein:

the lens is in an axially symmetric structure and the lens has a main portion formed by stretching along a longitudinal direction;

the inner surface comprises one first light-incident surface and two second light-incident surfaces, the two second light-incident surfaces are opposite to each other and are adjacent to the first light-incident surface; the first light-incident surface is a curved surface or a planar surface, each of the two second light-incident surfaces is a curved surface protruding toward a direction away from the first receiving chamber; and the first receiving chamber is defined by the first light-incident surface and the second light-incident surfaces;

the bottom surface is a surface adjacent to the second light-incident surface;

the outer surface comprises two first reflective surfaces, two first light-exiting surfaces, and two second light-exiting surfaces; the two first reflective surfaces are located in a middle top region and are intersected with each other; the two first light-exiting surfaces are located at both sides of the two first reflective surfaces; each of the two first light-exiting surfaces is intersected with one of the first reflective surfaces; and the two second light-exiting surfaces are adjacent to the first light-exiting surfaces; and the two first reflective surfaces form a V-shaped structure, and each of the second light-exiting surfaces is a curved surface protruding toward a direction away from the first receiving chamber.

2. The lens according to claim 1, wherein:

light rays incident onto the first light-incident surface are collimated upon being refracted by the first light-incident surface, then are incident onto the first reflective surface to be totally reflected by the first reflective surface, and exit through the first light-exiting surface; and light rays incident onto the second light-incident surface are incident onto the second light-exiting surface upon being refracted, and exit through the second light-exiting surface upon being refracted.

3. The lens according to claim 1, wherein a height of a ridged line at which the two first reflective surfaces are intersected with each other with respect to the bottom surface is smaller than a height of a ridged line at which the first light-exiting surface and the first reflective surface are intersected with each other with respect to the bottom surface.

4. The lens according to claim 1, wherein the first light-incident surface is a wavy curved surface, or a curved surface protruding toward the first receiving chamber.

5. The lens according to claim 1, wherein the first light-exiting surface is a planar surface.

6. The lens according to claim 1, wherein connecting portions are provided at both sides of the main portion; and the connecting portions protrude outward with respect to the main portion.

7. The lens according to claim 1, wherein the lens is in the axially symmetric structure of a linear form or a curved form, an extending direction of the lens is the longitudinal direction, a direction perpendicular to the longitudinal direction is a horizontal direction, a central axis of the lens is orthogonal with both the horizontal direction and the longitudinal direction, and cross sections of the lens at every point in the longitudinal direction are the same.

8. The lens according to claim 1, wherein the lens is in an axis-rotationally symmetric structure.

9. The lens according to claim 1, wherein a width of the lens is smaller than 35 mm.

10. The lens according to claim 1, wherein a width of the first light-incident surface is smaller than a distance between two edge lines of the first light-exiting surfaces that are opposite to each other.

11. The lens according to claim 1, wherein a height of the first receiving chamber is greater than a half of a height of the lens.

12. The lens according to claim 1, wherein the second light-incident surface has a first end and a second end along a height direction, the second light-exiting surface has a first end and a second end along the height direction, the second end of the second light-incident surface is closer to the bottom surface than the first end of the second light-incident surface to the bottom surface, the second end of the second light-exiting surface is closer to the bottom surface than the first end of the second light-exiting surface to the bottom surface, and a distance between the two first ends is smaller than a distance between the two second ends.

13. The lens according to claim 12, wherein the lens is in a ring shape, an arc shape or an axis-rotationally symmetric shape.

14. A lens, comprising a bottom surface, an inner surface, an outer surface, and a first receiving chamber configured to receive a light-emitting component, a wall surface of the first receiving chamber being the inner surface of the lens, wherein:

the inner surface comprises one first light-incident surface and a pair of second light-incident surfaces, the pair of second light-incident surfaces are opposite to each other, the first light-incident surface is connected with upper edges of the pair of second light-incident surfaces substantially in a horizontal direction;

the outer surface comprises two first reflective surfaces, two first light-exiting surfaces, and two second light-exiting surfaces; the two first reflective surfaces are located in a middle top region and are intersected with each other, the two first light-exiting surfaces are located at both sides of the two first reflective surfaces; and each of the two first light-exiting surfaces is intersected with one of the two first reflective surfaces; and the two second light-exiting surfaces are adjacent to the first light-exiting surfaces; and the two first reflective surfaces form a V-shaped structure, and the pair of the second light-incident surfaces and the two second light-exiting surfaces form a dual curved surface structure.

15. The lens according to claim 14, wherein:

light rays incident onto the first light-incident surface are collimated upon being refracted by the first light-incident surface, then are incident onto the first reflective surface to be totally reflected by the first reflective surface, and exit through the first light-exiting surface; and light rays incident onto the second light-incident surface are incident onto the second light-exiting surface upon being refracted, and exit through the second light-exiting surface upon being refracted.

16. The lens according to claim 14, wherein the lens and a light-emitting component are included in a light source module, and the light-emitting component comprises a light source plate and light-emitting units arranged on the light source plate, and the light-emitting units are received within the first receiving chamber of the lens.

17. The lens according to claim 16, wherein the light source plate is located beneath the bottom surface and is attached to the bottom surface.

18. The lens according to claim 17, wherein the light source plate is in a long strip shape; and the light-emitting units are arranged along a longitudinal direction of the light source plate.

19. The lens according to claim 16, wherein the lens has a main portion formed by stretching along a longitudinal direction.

* * * * *